Oct. 19, 1943.  H. C. PAULSEN  2,332,008
MACHINE FOR APPLYING STIFFENING COMPOSITION TO SHOE PARTS
Filed Nov. 24, 1941  8 Sheets-Sheet 1

INVENTOR
Hans C. Paulsen
by his attorney
Frederick L. Edmonds

Oct. 19, 1943. H. C. PAULSEN 2,332,008
MACHINE FOR APPLYING STIFFENING COMPOSITION TO SHOE PARTS
Filed Nov. 24, 1941 8 Sheets-Sheet 3

INVENTOR
Hans C. Paulsen
by his attorney
Frederick L. Emmons

Oct. 19, 1943.  H. C. PAULSEN  2,332,008
MACHINE FOR APPLYING STIFFENING COMPOSITION TO SHOE PARTS
Filed Nov. 24, 1941  8 Sheets-Sheet 4

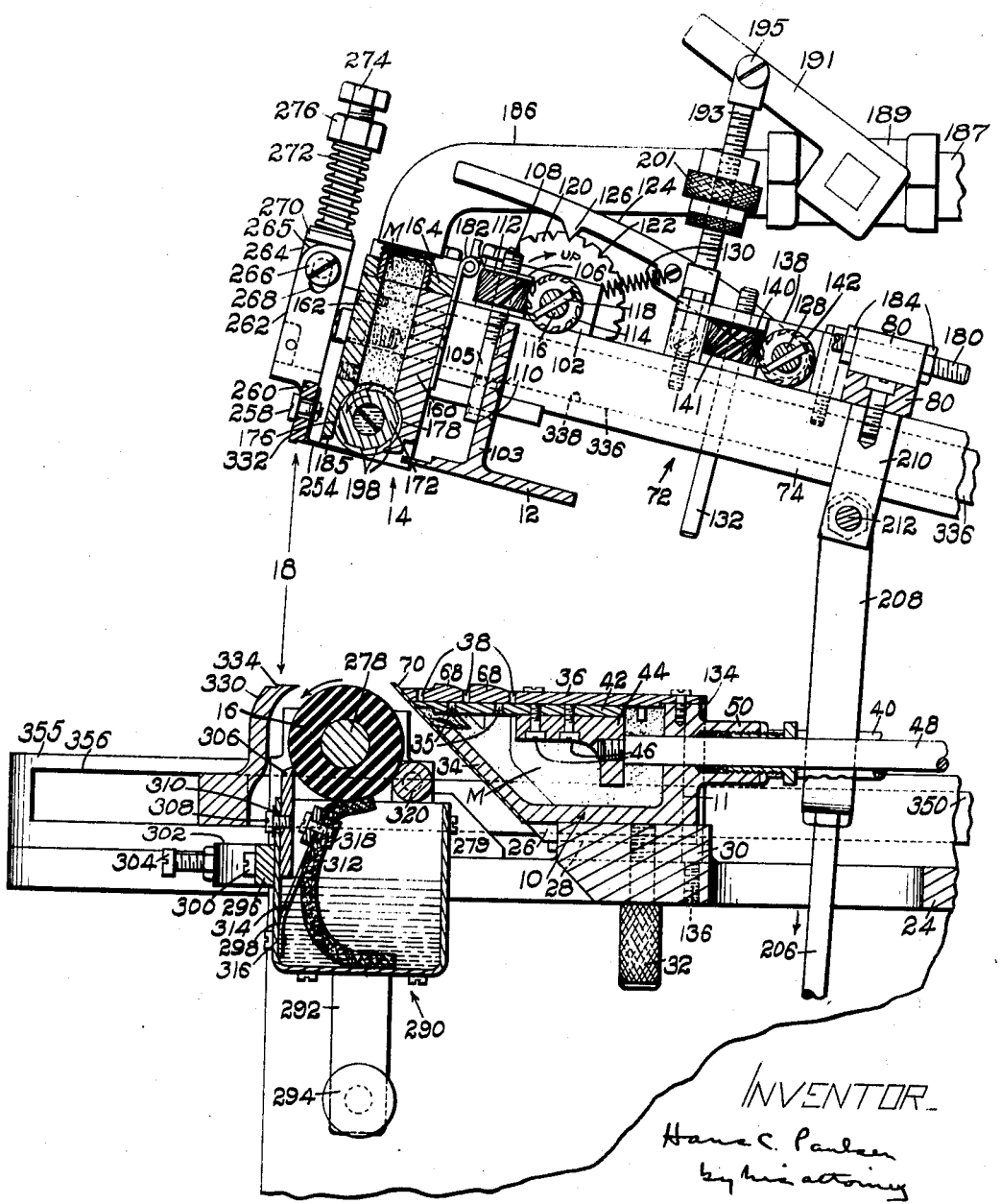

Oct. 19, 1943.    H. C. PAULSEN    2,332,008
MACHINE FOR APPLYING STIFFENING COMPOSITION TO SHOE PARTS
Filed Nov. 24, 1941    8 Sheets-Sheet 6
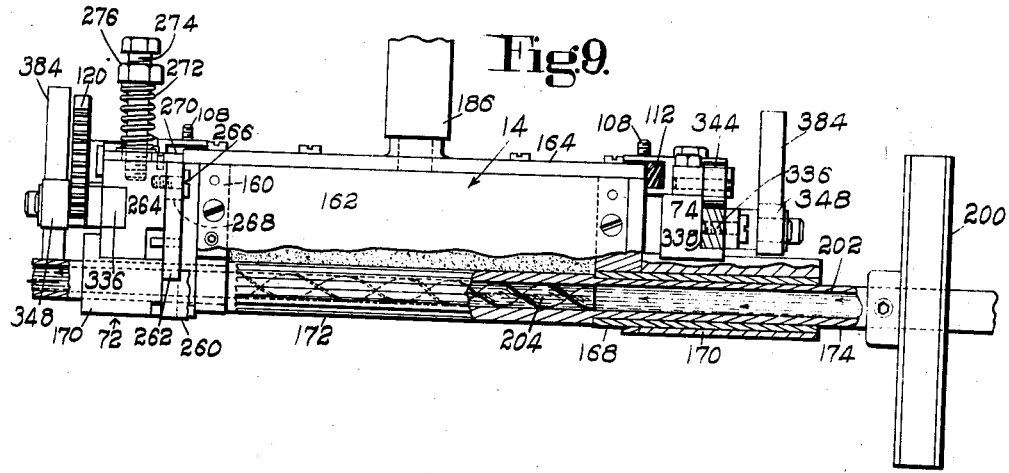
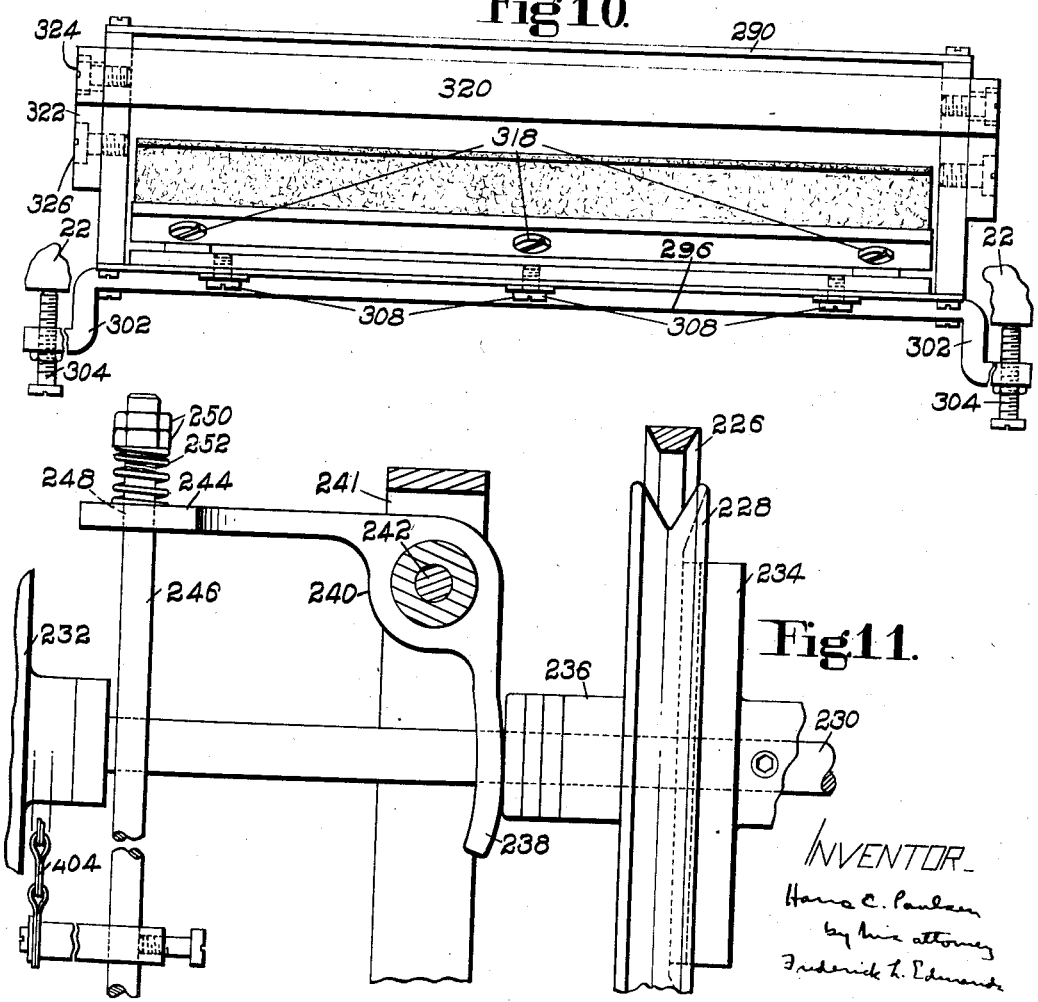

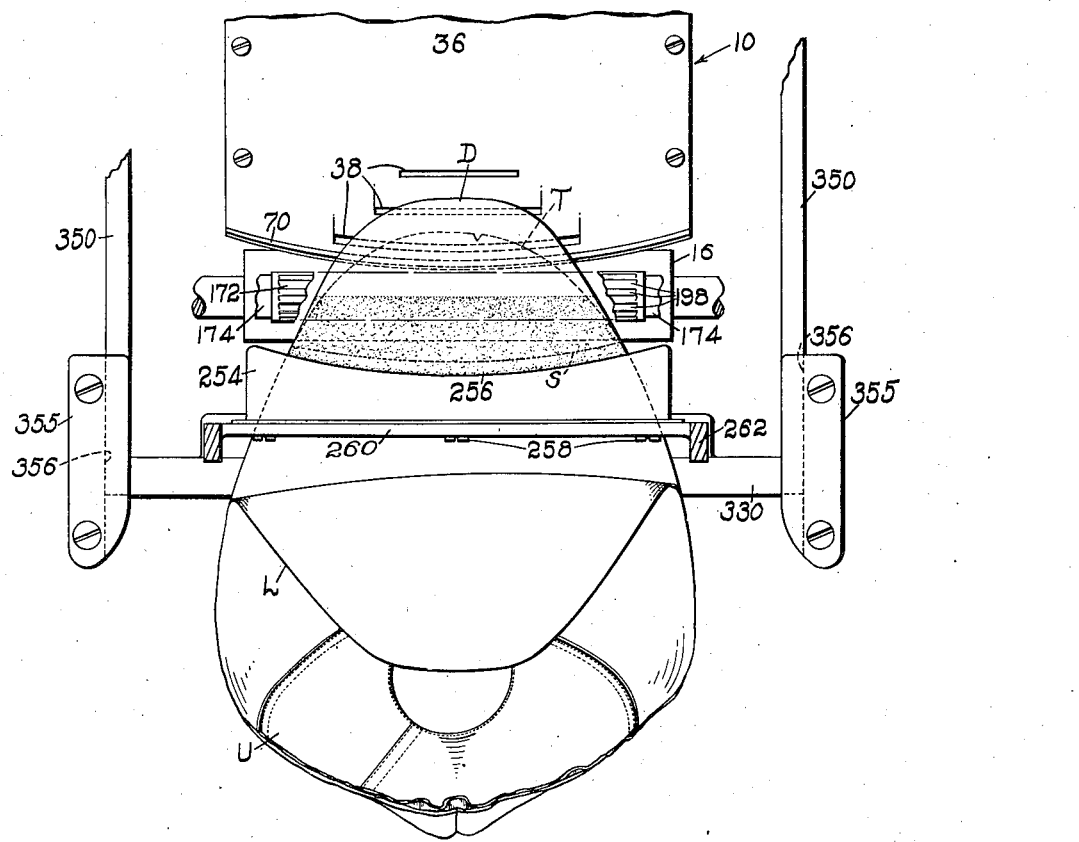
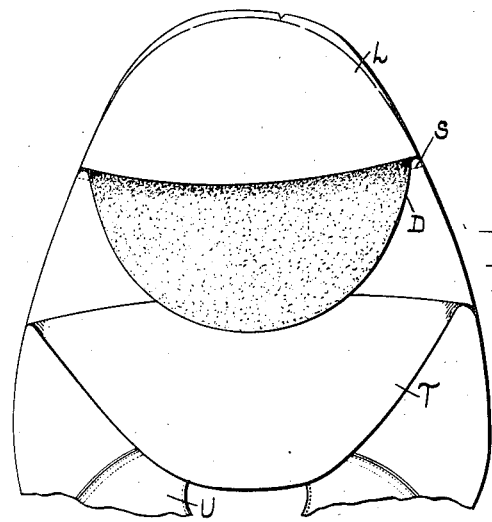

Oct. 19, 1943.   H. C. PAULSEN   2,332,008
MACHINE FOR APPLYING STIFFENING COMPOSITION TO SHOE PARTS
Filed Nov. 24, 1941   8 Sheets-Sheet 8
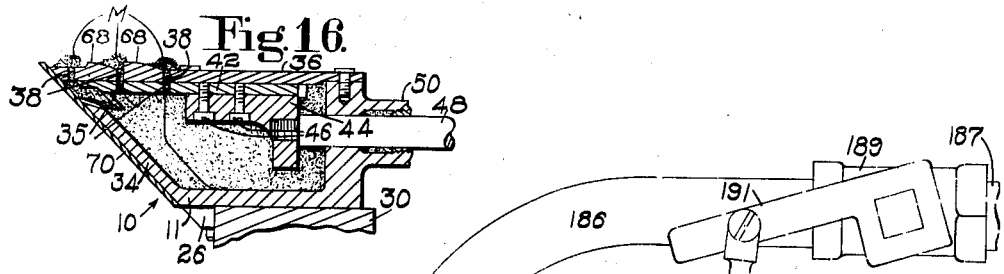
Fig. 16.
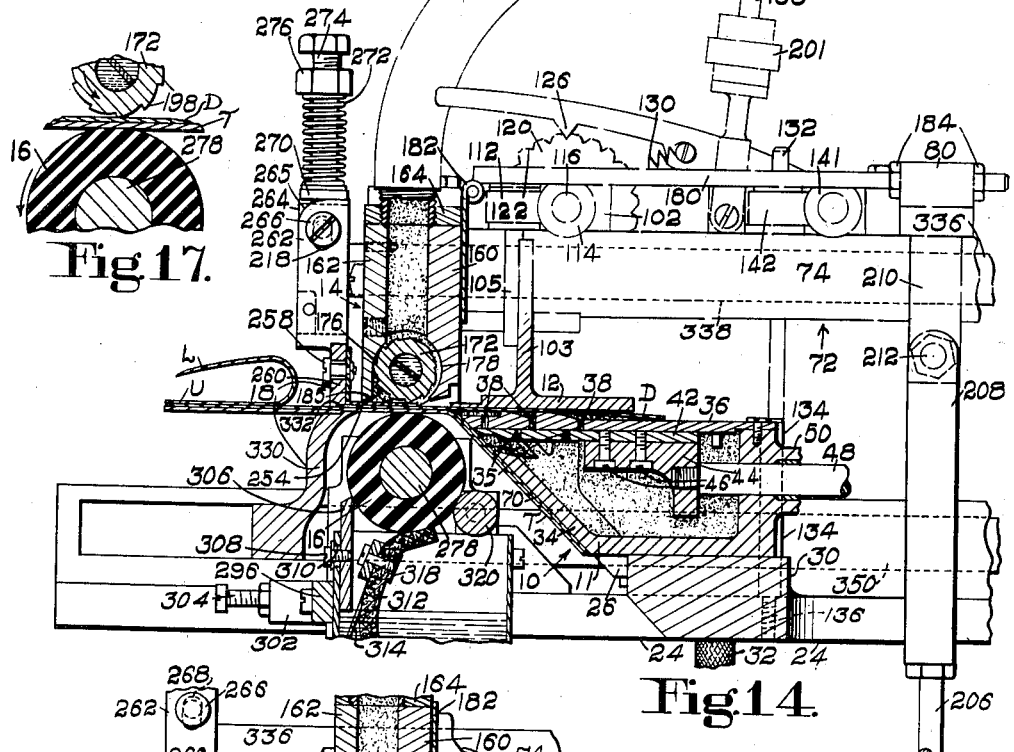
Fig. 17.
Fig. 14.
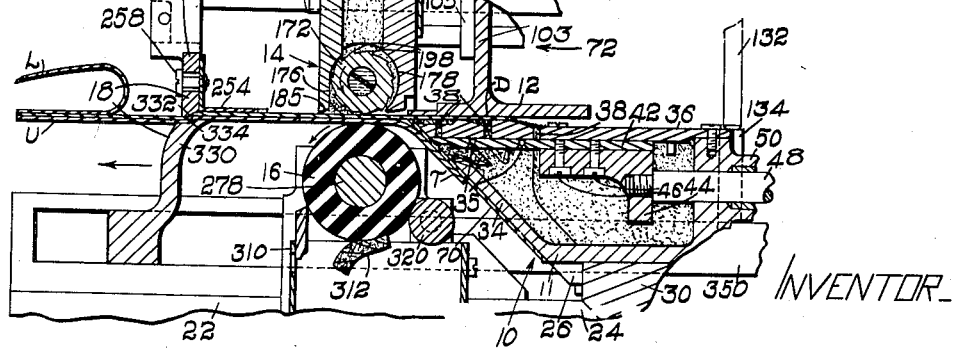
Fig. 15.
INVENTOR
Hans C. Paulsen
by his attorney
Frederick L. Edmonds Patented Oct. 19, 1943

2,332,008

UNITED STATES PATENT OFFICE 2,332,008

MACHINE FOR APPLYING STIFFENING COMPOSITION TO SHOE PARTS

Hans C. Paulsen, Medford, Mass., assignor to United Shoe Machinery Corporation, Flemington, N. J., a corporation of New Jersey Application November 24, 1941, Serial No. 420,274

63 Claims. (Cl. 12—52)

This invention relates to a machine for applying a stiffening composition to sheet material, particularly to parts of shoes.

It is customary to incorporate in the toe of the shoe a reinforcement consisting of a piece of fabricated material which has been impregnated with some composition which will set or stiffen, under certain conditions, to prevent damage to the toe and generally to enhance its finished appearance. Such a reinforcement is commonly called a "box" and, when incorporated in the shoe, the shoe is said to have a box toe. The type of reinforcement and mode of assembly will vary with manufacturers according to what they think is best, and therefore no attempt will be made here to discuss any one in particular. It will suffice to point out, however, that much difficulty is still experienced in securing such a reinforcing piece so that it will not shift about after the shoe has been subjected to wear, thereby causing wrinkles and bulges on the inside of the shoe which render it uncomfortable, and perhaps unwearable. Such a condition results in failure to support the toe portion or tip in places, which detracts from the appearance of the shoe and permits it to lose its shape. One way of avoiding this trouble is to eliminate the reinforcing piece and to reinforce the toe by coating the lining or doubler with a stiffening composition. Because the lining or doubler is stitched to the upper and lasted in with the upper around the toe, there will be substantially no relative movement of the parts. While the edges of the lining and doubler are well secured, some difficulty may still be had with the central portion thereof for the following reason. It is usual to employ a lining or doubler, or both, with a nap on one or both sides in order to secure a plump, full-appearing and soft-feeling upper. The nap is thick and it is therefore difficult to produce a good bond between the lining and doubler and the inside of the tip because the stiffening material applied thereto remains on the ends of the fibers and, if a severe stress is set up between the tip and lining, the fibers break away, leaving the lining or doubler unattached to the tip except as stitched and as lasted in about the margins. The central portion of the lining or doubler may, therefore, drop away from the toe and cause discomfort to the wearer. If, however, the stiffening composition is driven through the nap and into the interstices of the lining or doubler, there will be very little likelihood that these parts will separate from the tip after they have been brought together and lasted.

A method for obtaining such penetration is disclosed in an application for United States Letters Patent Serial No. 388,398, filed April 14, 1941, in the name of W. H. Wedger. In that application the stiffening composition is applied by the use of a spatula and is driven into and through the fabric of the lining or doubler to cause complete penetration thereof. A stiffening composition suitable for application to the lining or doubler is disclosed in the aforesaid application.

The application of the stiffening composition to the lining member by hand is tedious and slow. Accordingly, it is an object of the present invention to provide a machine for coating the lining and for uniting the upper and coated lining quickly and effectively.

With the above object in view, features of the machine of this invention reside in means for applying a quantity of stiffening composition to one side of a lining member after it has been separated from the tip and in means for progressively bringing the lining member and tip together to cause them to adhere, thereby providing an integrated upper for the subsequent lasting operation.

When the assembled upper includes a doubler as well as a lining, it is desirable to coat both sides of the doubler so that the upper and lining will adhere to the opposite sides of the doubler. One side of the doubler is coated and brought into engagement with the tip in the manner related above, and, according to a further feature of the invention, the means for bringing the coated side of the doubler into engagement with the tip is, as illustrated, adapted to apply a coating of stiffening composition to the opposite side of the doubler.

The details of the construction of the machine will now be described in detail with reference to the accompanying drawings, in which Fig. 1 is a side elevation of the entire machine;

Fig. 8 is a side elevation, in section, at the forward part of the machine, showing the upper and lower applying means;

Fig. 9 is a detail, partly in section, of the upper applying means in front elevation;

Fig. 10 is a detail of the means for cleaning the supporting roll;

Fig. 11 is a detail of a clutch;

Fig. 12 is a fragmentary plan veiw, showing the work placed in the machine in position for the application of stiffening composition;

Fig. 13 is a plan view of the forepart of a shoe upper, showing the tip, doubler and lining;

Fig. 14 is a side elevation of the forward part of the machine, partly in section, showing the position of the work at the beginning of the application of stiffening composition thereto;

Fig. 15 is a section similar to Fig. 14, showing the work partly withdrawn from the machine;

Fig. 16 is a detail in section of the lower applying means; and

Fig. 17 is a detail, in section, of the beater roll.

Figure 1:
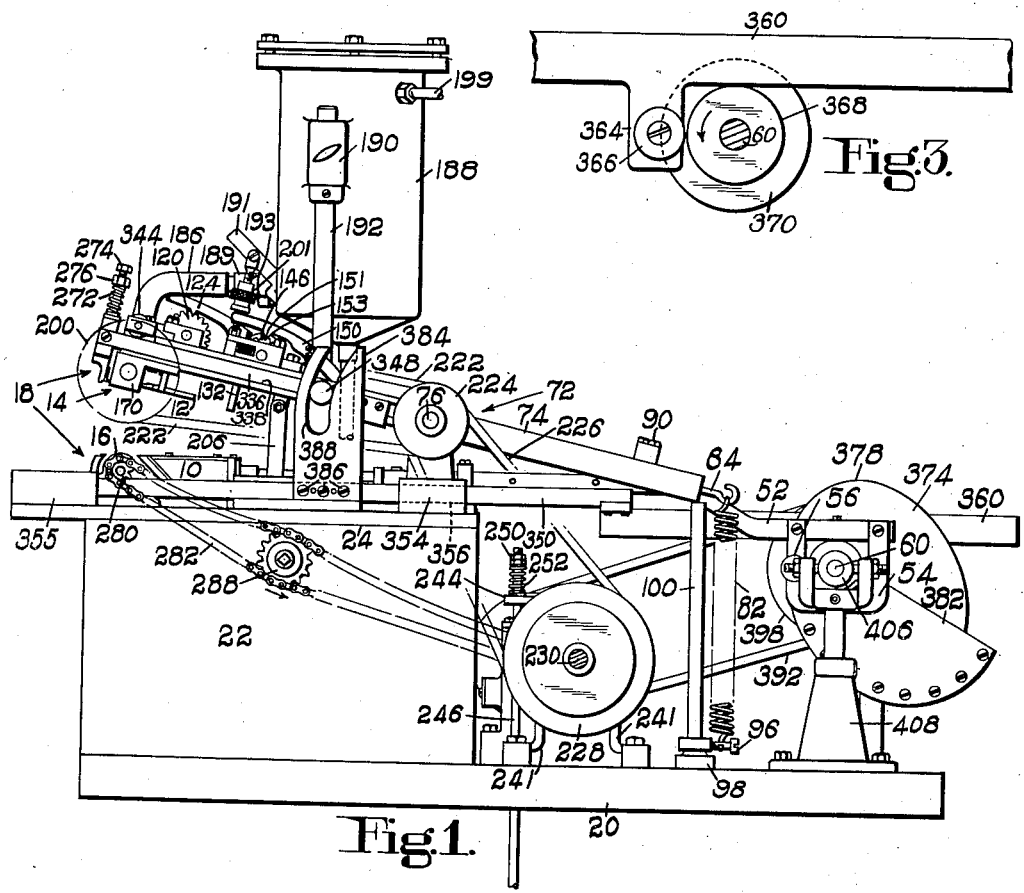

In Fig. 13 there is illustrated the forepart of a partially assembled upper U consisting of a toe portion or tip T, a doubler D, and a lining L. The machine for applying stiffening composition to the work is shown in Fig. 1 and comprises essentially an applying means 10 against which one side of the work may be placed, a presser plate 12 for holding the work against the applying means 10, another applying means 14 for applying stiffening composition to the opposite side of the work, a support 16 for supporting the work when the applying means 14 is in engagement therewith, and jaws 18 which grip the work and drag it laterally between the members 10, 12, 14 and 16. The aforesaid parts are assembled in co-operating relation on a frame consisting of a base 20, spaced vertical walls 22 and a horizontal top member 24 which rests upon and is secured to the top edges of the walls 22.

When an upper consisting of a tip, a doubler and a lining is to be treated, both sides of the doubler are coated and, in such a case, both of the applying means are employed, that is, the means 10 and 14. While it is customary to place the work in the machine with the tip on the underside and the lining on the top side, this is not a requisite and the position of the work may be reversed without adversely affecting the quality of the work. Sometimes the doubler is omitted and a member having one side finished like a lining and the other side napped like a doubler is employed. When a member of this character, hereinafter called a doubler-lining, is used, only the surface adjacent to the tip is coated and, in such a case, one of the applying means is not used. If the doubler-lining is placed with the tip down, then the applying means 10 coats the under or napped side thereof and the supply of stiffening composition to the applying means 14 is cut off, as will appear hereinafter, so that no stiffening composition is delivered to it. However, a beater roll 172 (Fig. 17), which is associated with the applying means 14 and the support 16, serves to press the doubler-lining and tip together as they are withdrawn. If the work is reversed, the supply of stiffening composition to the applying means 10 is cut off and the stiffening composition is applied to the napped side of the doubler-lining by the applying means 14. In this case, the tip must be laid against the coated side of the doubler-lining after it is withdrawn from the machine. Sometimes the lining member, which may be a doubler or a doubler-lining, is stitched to the tip so that it cannot be separated therefrom for the application of the stiffening composition to the side adjacent to the tip. When such a condition exists, the applying means 10 is rendered inoperative and the work is placed in the machine with the exposed side of the lining member opposite the applying means 14 which drives the stiffening composition through the fabric sufficiently to cause the inside or unexposed side of the lining member to adhere to the tip.

Figures 2, 4:
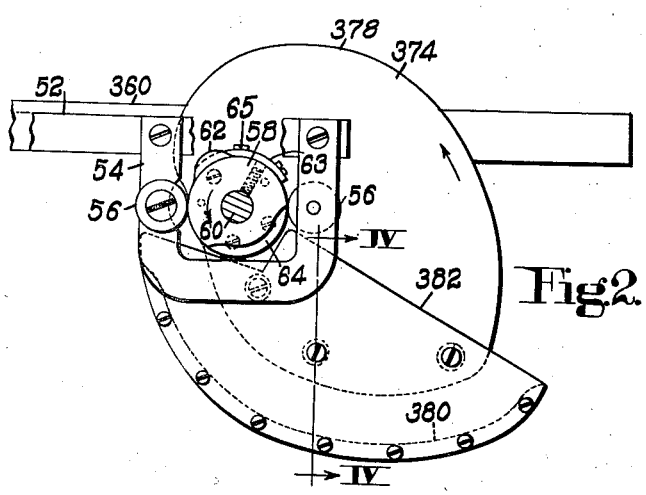
Fig. 2 shows a cam employed for driving various parts of the machine.
Fig. 4 is a section taken on the line IV—IV of Fig. 2.
Figure 5:
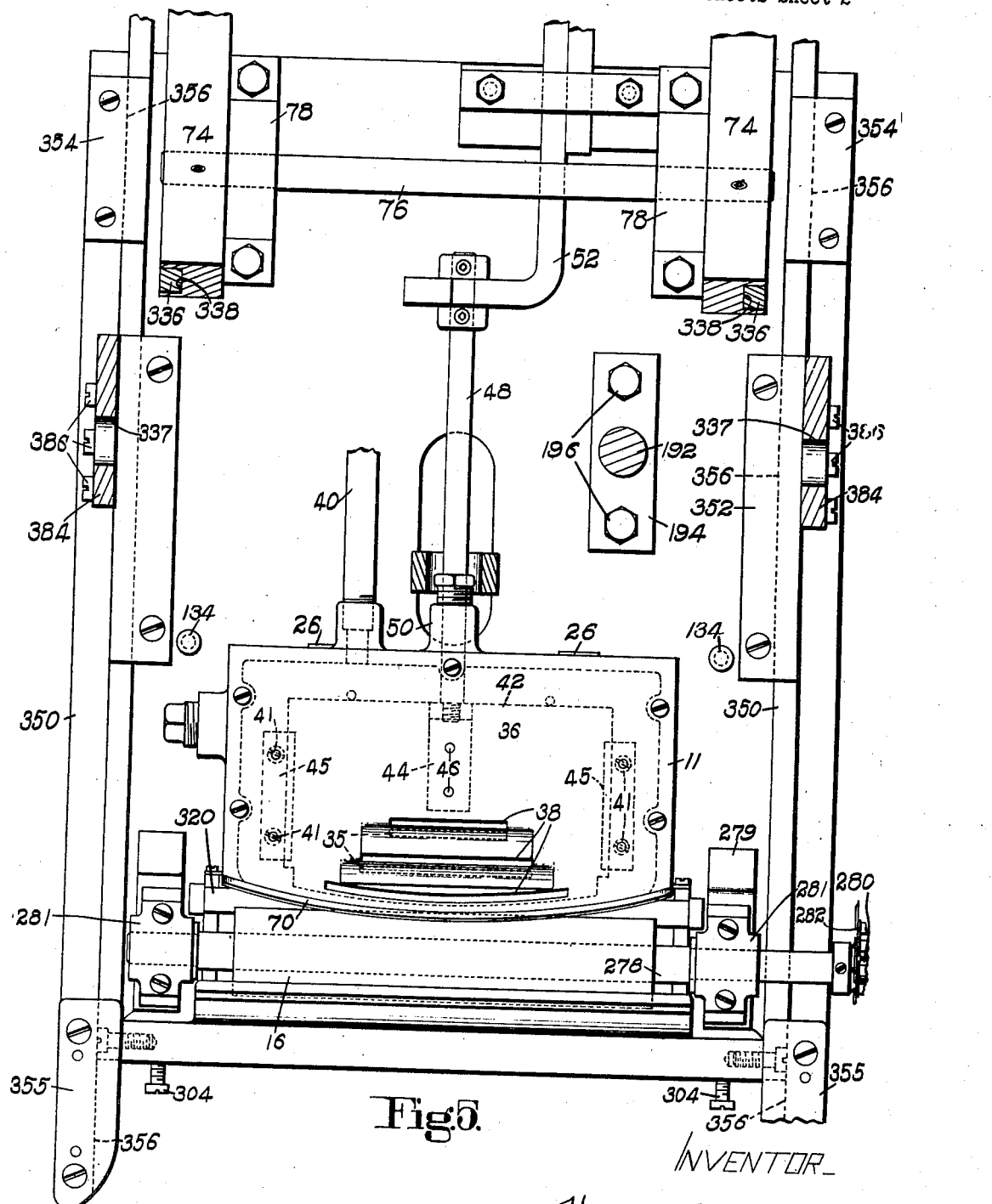
Fig. 5 is a plan view of the forward part of the machine with the upper applying means removed.

The applying means 10, against which the work is held for the application of stiffening composition to one side thereof, comprises a generally rectangular box-like receptacle 11 removably fastened to the top member 24 (Figs. 14, 15 and 16). To this end, tongues 26 are formed on the underside of the receptacle 11 at the opposite ends thereof. The tongues fit into grooves 28 (Fig. 8) formed in a boss 30 projecting from the upper side of the top member 24. Knurled thumbscrews 32 are passed upwardly from the underside of the top member 24 into the tongues 26. By removing the thumbscrews, the receptacle 11 may be dismounted for cleaning. The receptacle 11 is provided with a sloping front wall 34 to facilitate placing the work in the machine, the sloping surface of the wall serving to separate the tip from the doubler or doubler-lining, as shown in Figs. 14 and 15, the tip sliding down along this surface away from the doubler or doubler-lining, when the work is inserted, without catching or bunching. The top of the receptacle 11 is provided with a horizontal cover member 36 upon which the work is placed, and a number of parallel elongated slots 38 are formed therein through which the stiffening composition may be extruded in predetermined amounts to the underside of the work (Fig. 16). It is to be observed (Fig. 5) that the front wall of the receptacle 11 is convex and that the slot 38 nearest this wall is correspondingly curved. The reason for this is that the stitching joining the tip and doubler, or tip and lining, along what is called the tip sweep lies in a curved line and, in order to get the stiffening composition in close to the line of stitching, the receptacle must be provided with a curvature corresponding to that of the stitch line. The curvature of the stitch line or tip sweep is not always in the same direction or of the same shape and therefore a substitute receptacle (not shown) will be provided with a front wall which has a curvature corresponding to the tip sweep of the work being operated upon. The stiffening composition, which is designated as M, is delivered under pressure, as will appear hereinafter, to the inside of the receptacle 11 through a conduit 40 (Fig. 5). In order to control the delivery of the stiffening composition through the slots 38, a valve plate 42 is disposed on the inside of the receptacle 11 and is provided with elongated slots 35 which correspond to the rear slots 38. The front slot is covered and uncovered by the front edge of the valve plate. The valve plate 42 is slidably held in contact with the underside of the horizontal cover member 36 by strips 45 (Fig. 5) fastened to the underside of the member 36 by screws 41, the strips being undercut on their inner edges to slidably receive the ends of the valve plate 42. The valve plate is reciprocated by a rod 48 one end of which is screwed into a block 44 (Fig. 16) fastened to the rear edge of the valve plate by screws 46 and the other end of which is connected to a reciprocable bar 52 (Fig. 5). The rod 48 passes through the rear of the receptacle through a stuffing box 50. The reciprocation of the valve plate 42 is timed so that a predetermined quantity of stiffening composition is permitted to pass from the inside of the receptacle 11 through the slots 35 and 38 to the top of the cover member 36 in readiness for each succeeding piece of work. The bar 52 to which the rod 48 is attached is arranged to be reciprocated and, to that end, the free end of the bar 52 has fixed thereto a U-shaped member 54 (Fig. 2). A pair of cam followers 56 are mounted on opposite sides of the U-shaped member 54 (Fig. 6) and co-operate with the surface of a cam 58 which is fixed to a rotating shaft 60. The surface of the cam 58 is provided with a nub 62 and a recess 64 so that, as the shaft 60 rotates, the rod 52 will be pushed to the left, as viewed in Figs. 1 and 2, when the nub 62 comes into contact with the left-hand cam follower 56. As soon as the nub 62 passes the left-hand cam follower, the rod 52 will be returned to its original position by the right-hand cam follower as it rides out of the recess 64. The nub 62 is formed integral with a strap 63, the strap being fastened to the surface of the cam by screws 65. Slots are provided in the strap to permit adjustment of the nub 62 to obtain the proper timing. The cam 58 is so set that the valve plate 42 is actuated to deliver a predetermined quantity of stiffening composition through the slots of the member 36 during the period when the operative parts of the machine are returning to their initial positions for the reception of a new piece of work.

In order to force the stiffening composition into the nap of the fabric and into the texture thereof, the stiffening composition must be subjected to pressure and to a scraping or wiping action. Preferably, the pressure should be applied gradually, from a minimum to a maximum, during the scraping action. This is accomplished in the present machine by holding the work by means of the presser plate 12 against ridges 68 (Figs. 8 and 16) formed on the upper surface of the cover member 36 adjacent to the elongated slots 38. The surface of each ridge slopes upwardly from the edge of one slot toward the slot in advance of it (Fig. 5). Consequently, when the fabric is dragged across these ridges under the pressure of the presser plate, the stiffening composition is subjected to gradually increasing pressure as the spaces between the surface of the ridges and the presser plate become less and less. In order to remove any excess stiffening composition from the surface of the work as it is drawn from between the cover member 36 and the presser plate 12, a doctor blade 70 (Fig. 8) is fixed to the front edge of the member 36 adjacent to the last elongated opening 38. This doctor blade is secured to the sloping front face 34 of the receptacle 11 with its upper edge at substantially the same level as the apices of the ridges 68. The doctor blade serves not only to remove the excess stiffening composition but also to give a final scraping action, thereby aiding in driving the stiffening composition into the fabric.

Figure 6:
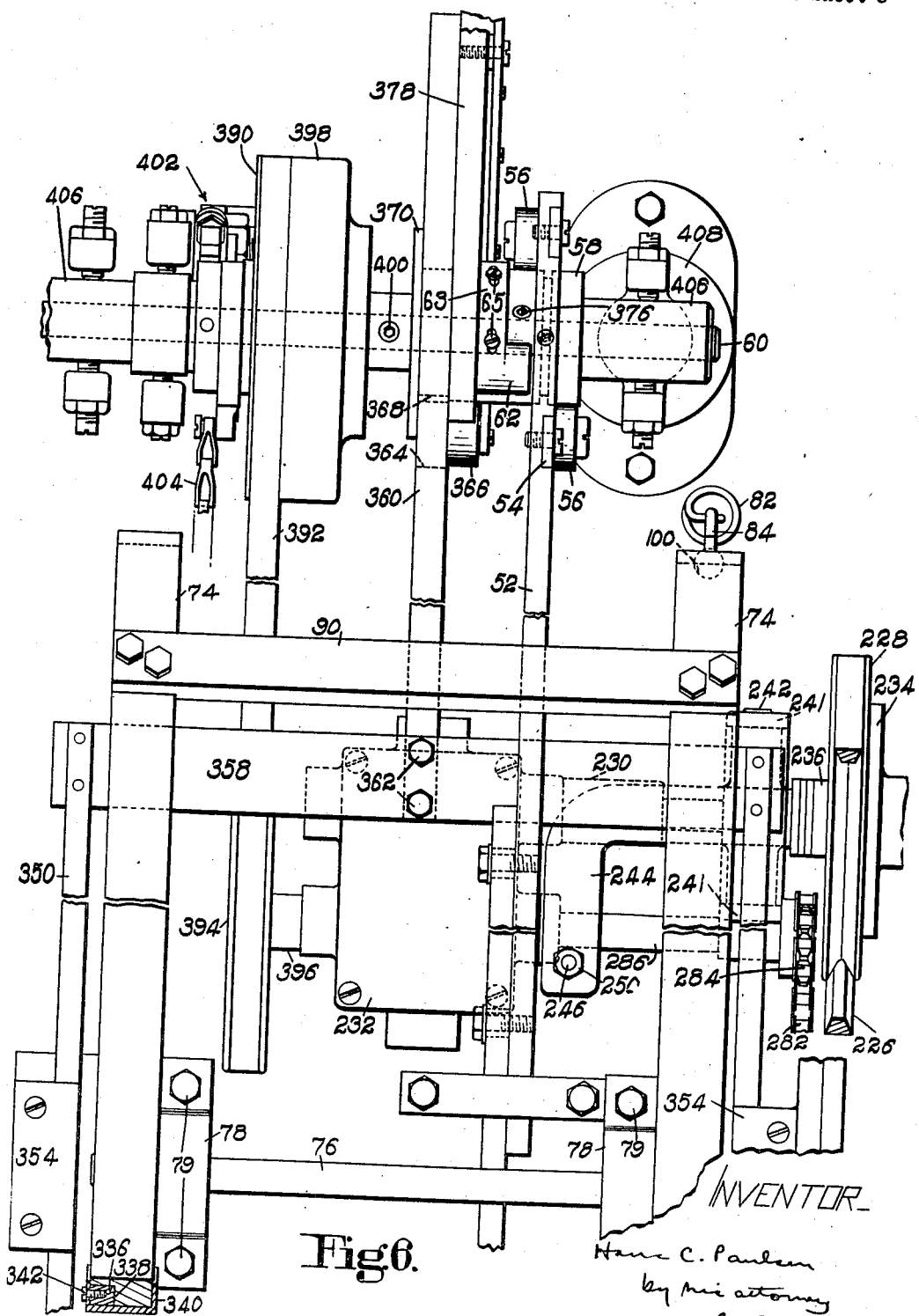
Fig. 6 is a plan view of the rear part of the machine with the upper applying means removed.
Figure 7:
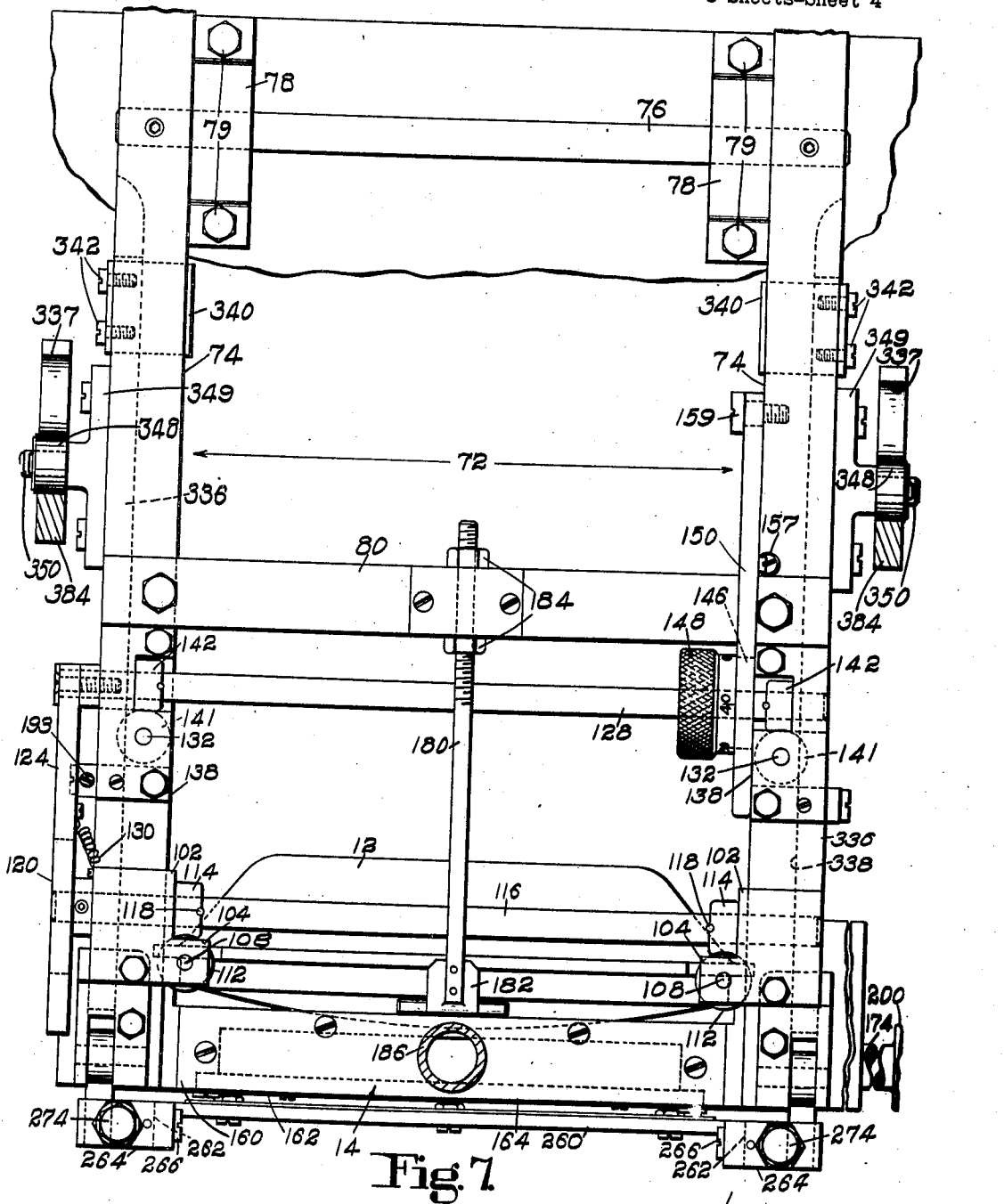
Fig. 7 is a plan view of the forward part of the upper applying means.

The presser plate 12 is adapted to hold the work firmly against the upper surface of the cover member 36 of the receptacle 11 during the withdrawal of the work and, to this end, is mounted for movement to and from the surface of the member 36 upon a swinging carrier or support, indicated generally by the reference character 72 (Fig. 8), the carrier consisting of a pair of parallel spaced members 74. The members 74 are pivotally mounted on a spindle 76 (Fig. 7), the spindle being journaled in a pair of bearings 78 fastened to the top member 24 by bolts 79. The spaced members 74 are joined between their ends by cross members 80 and 90 which are bolted to the top of the members, as shown in Figs. 6 and 7. The carrier is normally held inclined from front to back, as shown in Figs. 1 and 8, by a spring 82 which is fastened at one end to a hook 84 screwed into the end of one of the members 74 and at its opposite end to a screw 96 threaded into a boss 98 which is fastened to the top member 24. The boss 98 serves as a support for a stop 100 which is disposed so that its upper end will contact the end of one of the members 74 and prevent the carrier 72 from being tipped beyond the position illustrated in Fig. 1.

The presser plate 12 is mounted on the carrier 72 so that it may be adjusted to and from the surface of the cover member 36 after the carrier has been brought down from its retracted position to its operative position in order to govern the thickness of the stiffening composition on the work and also to vary the pressure. To this end, a pair of bearings 102 are bolted to the top of the members 74 close to their free ends (Figs. 7 and 8). A lateral projection is formed on the inside of each bearing. The underside of each of the projections is recessed at 106, for a purpose which will appear shortly. The presser plate 12 has formed integral therewith an upstanding vertical web 103. A spindle 105 is fastened to each end of the web. The upper ends of the spindles 105 extend above the edge of the web and are threaded at 108. The threaded ends of the spindles are passed through openings piercing the recessed portions of the lateral projections of the bearings 102. In the recesses 106 are disposed spiral gears 112 having threaded openings to receive the threaded ends 108 of the spindles. These spiral gears mesh with spiral gears 114 which are rigidly fastened by pins 118 (Fig. 7) to the opposite ends of a spindle 116 journaled in the bearings 102. One end of the spindle 116 is extended through its bearing 102 and has fastened to its free end a ratchet wheel 120 which the spindle may be turned to adjust the presser plate 12 up and down. This ratchet wheel is marked with a scale and is provided with detents 122 corresponding with the scale markings (Fig. 8). A pawl 124 provided with a tooth 126 is mounted for rotation on a spindle 128 and is yieldably urged toward the ratchet wheel 120 by a spring 130. By rotating the wheel 120, the position of the presser plate 12 may be adjusted to get the desired thickness of coating on the work and, once this is determined, it may readily be duplicated by reference to the scale. When the proper adjustment has been made, the tooth 126 may be dropped into engagement with one of the detents 122 to hold the presser plate 12 from joggling out of adjustment by the vibration of the machine.

The applying means 14 employed for the opposite side of the work also applies the stiffening composition by gradually increasing rubbing pressure and by scraping. The applying member 14 is mounted at the forward end of the side members 74 adjacent to the presser plate 12 and consists of a rectangular box-like receptacle comprising a casting 160 (Figs. 8 and 9) which forms the rear and side walls thereof. The receptacle is completed by a front wall 162 screwed to the side walls and a cover 164 screwed to the top of the casting. The bottom of the receptacle is left open and a beater roll 172 is mounted in the receptacle with its lower side projecting through the opening. The front and rear walls of the receptacle are recessed at their inner sides at 176 and 178 in order closely to fit about the peripheral surface of the beater roll 172 so that none of the viscous stiffening composition will escape through the opening around the roll. The beater roll is provided at each end with reduced portions 174 (Fig. 9) which pass through the walls of the receptacle into bearing sleeves 168 mounted in bearing blocks 170 fastened to the members 14 near their ends. The bearing sleeves 168 are projected inwardly from the members 14 and form trunnions upon which the receptacle is tiltably hung, for a purpose which will appear hereinafter. The stiffening composition is delivered to the receptacle through a flexible tube 186 which is connected at one end to the top of the receptacle and at its opposite end to a pipe 187 (Fig. 8) extending from a reservoir 188 (Fig. 1) by means of a combination coupling and valve 189. The reservoir 188 is provided with a boss 190 by which it is fastened to a vertical post 192, the post, in turn, being secured to the top member 24 at its base 194 by bolts 196 (Fig. 5). The stiffening composition in the reservoir 188 is maintained under pressure by means of a pressure line 199 which is connected to a commercial compressor type pump, not shown herein. It is within the scope of the invention to employ any other means for applying pressure to the stiffening composition in the reservoir 188, as, for example, a piston pump. The combination coupling and valve 189 is provided with a valve handle 191 (Fig. 8) which is connected to one of the side members 14 by a rod 193. The rod 193 is divided between its ends and joined by a knurled nut 201 which permits the rod to be lengthened and shortened, thereby controlling the time and length of opening and closing of the valve, and accordingly the amount of stiffening composition delivered to the receptacle 160. It is to be observed that the amount of stiffening composition delivered to the receptacle may also be governed by the speed of the pump employed for applying pressure to the stiffening composition in the reservoir. If it is desirable to cut off the supply of stiffening composition from the reservoir 188 to the beater roll 172, as, for example, when only the underside of the work is to be coated, the nut 201 may be removed so that the valve handle 191 will not be operated by the raising or lowering of the carrier 72. In general, however, when the carrier 72 is lowered, the handle 191 will turn in a counter-clockwise direction to open the valve, whereupon the stiffening composition will be forced under pressure into the receptacle 160. This occurs during the time that the stiffening composition is being applied to the work. When the application is finished and the work has been removed, the carrier 72 returns to its original position and in doing so, the handle 191 is turned in a clockwise direction to close the valve and cut off the pressure.

In order to secure a gradually increasing pressure and scraping action as the work is pulled laterally, the surface of the beater roll 172 is provided with ridges 198 (Fig. 17) the back sides of which increase in radius of curvature toward their outer edges. The roll is rotated in such a direction that the portion of the ridge of least radius of curvature strikes the work first. Consequently, as the roll turns, the pressure between the ridge and the work becomes greater and greater until the edge is in engagement with the work. As the edge passes the work and while under the maximum pressure, the stiffening composition is scraped and driven into and through the work so that it coalesces with the stiffening composition applied to the opposite side. It is to be observed that the amount of penetration produced by the beater roll may be governed by adjusting the beater roll with respect to the support. The beater roll 172 is rotated at high speed and the grooves in its surface take up the stiffening composition from the receptacle and carry it down into contact with the work. The beater roll is rotated in the direction of the arrow, as illustrated, which is in a direction opposite to the movement of the work. This tends to drive the stiffening composition into the interstices of the work rather than to lay it onto the surface of the work, as would be the case if the roll turned in the same direction as the movement of the work. For this purpose a pulley 200 (Fig. 9) is fixed to the end of the reduced portion 174 of the beater roll. The rotation of the beater roll at the high speed necessary for properly beating and scraping the stiffening composition into the fabric creates a considerable amount of heat and, because of the close fit between the surface of the beater roll and the concave surfaces 176 and 178 of the receptacle, the roll is likely to bind when it becomes heated. To avoid this heating, the beater roll 172 is made hollow and either air or water is continuously passed therethrough from one end to the other by means of a screw pump 204, as indicated in Fig. 9. The screw pump 204 is disposed in that part of the passage which passes through the beater roll. The ends of the beater roll may be connected with a closed system (not shown) containing a cooling medium such as water and in that case the pump 204 produces constant circulation.

The beater roll delivers an excess of stiffening composition to the surface of the work. In order to regulate the thickness of the stiffening composition on the surface of the work and to remove any excess, the lower edge of the front wall of the receptacle 160 is beveled slightly, as illustrated at 185. Since the receptacle is mounted, as heretofore indicated, so that it may be tipped about the trunnions formed by the inner ends of the sleeves 168, this edge may be brought close to the surface of the work. The edge 185 acts as a doctor or scraper, removing the excess stiffening composition and governing the thickness of the coating. The excess stiffening composition is carried back by the beater roll into the receptacle, clearance between the roll and the back wall being provided for that purpose. To provide for angular adjustment of the receptacle about the trunnions to move the edge 185 to or from the surface of the work, a rod 180 (Fig. 7) is fastened at one end by a hinge 182 to the rear wall of the receptacle, the other end of the rod being passed through the crossbar 80 and secured in place by nuts 184.

By reference to Fig. 12 it is at once evident that, as the upper is withdrawn, the length of the beater roll which actually applies the stiffening composition to the work becomes less and less because the work narrows down toward the end of the toe portion. Therefore, the portions of the beater roll that do not contact the work remove stiffening composition from the receptacle which is not used. This excess stiffening composition is carried back into the receptacle through the clearance between the beater roll and the back wall of the receptacle, as described above.

In order to bring the presser plate 12 and applying means 14, which includes the beater roll 172, into contact with the work, a treadle rod 206 (Fig. 8) is provided which is attached to the crossbar of a yoke 208, the ends of the yoke being fastened to straps 210 by bolts 212, the straps, in turn, being fastened to the members 74 by the overlying crossbar 80. A treadle (not shown) is provided for operating the treadle rod 206.

The carrier 72 is held in its operative position against a pair of stops which limit its downward movement and govern the proximity of the applying means 14 to the support 16. These stops are adjustable in a manner similar to that employed for the presser plate 12. The stops comprise a pair of pins 132 which are mounted on the carrier 72 in a position to co-operate with a pair of pins 134 mounted on the top member 24. The pins 134 have at their lower ends threaded portions 136 by which they are screwed into the top member 24 in a vertical position. Adjustment of the pins 132 is provided as follows. A pair of bearing blocks 138 similar to the bearing blocks 102 are bolted to the top of the members 74. These bearing blocks are provided with recesses 140 for the accommodation of spiral gears 141. The upper portions of the pins 132 are threaded in the spiral gears 141 disposed in the recesses 140 and pass through openings in the bearing blocks 138. Spiral gears 142 mesh with the gears 141 and are fastened to the spindle 128 which is journaled at its opposite ends in the bearing blocks 138. A ratchet wheel 146 is mounted on the spindle 128 (Fig. 7) and is provided with a knurled portion 148 by which it may be turned to adjust the pins 132 to the proper position. The knurled portion is graduated so that the position of the pins 132 may be duplicated once their proper position has been determined. In order to hold the ratchet wheel 146 in its adjusted position, a pawl 150 (Fig. 1) having a tooth 151 near one end is held in engagement with one of the detents 153 on the ratchet wheel by means of a spring 157. The lever 150 is fastened at its opposite end to one of the side members 74 by a screw 159.

While the valve 189 is closed when the beater roll 172 is in its retracted position so that no stiffening composition is delivered to the receptacle 160, the rotation of the roll tends to carry some of the stiffening composition out of the receptacle and to cause an excess amount to accumulate on the underside of the receptacle and, since the stiffening composition slowly cures on exposure to air, it may become hard and caked around the bottom of the receptacle. To prevent this as far as possible, the beater roll is arranged so that, when it is retracted, it ceases to rotate. To this end, the pulley 200 is connected to a pulley 224 by a belt 222 (Fig. 1). The pulley 224 is mounted on the shaft 76 and, in turn, is driven by a belt 226 from a pulley 228. The pulley 228 is loosely mounted on a shaft 230 which extends from a gear box 232 (Fig. 6), the shaft being driven by gearing (not shown). Adjacent to the pulley 228 there is fastened to the shaft 230 a clutch disk 234 (Fig. 11) which rides freely against the surface of the pulley 228 when the beater roll is in its retracted position. Consequently, there is no driving connection between the pulley and the shaft 230. A hub 236 is formed on the opposite side of the pulley 228, and one arm 238 of a bell-crank lever 240 which is mounted on a spindle 242 is disposed in a position to be brought up against the hub 236 to force the pulley 228 into contact with the clutch disk 234. The spindle 242 is journaled at its ends in a wicket-shaped member 241 the legs of which are fastened to the base 20. A thrust bearing is placed on the shaft 230 between the arm 238 and the hub 236 to reduce wear. In order to establish a driving connection between the pulley and the clutch, the beater roll 172 is drawn down by the treadle rod 206 to bring it into contact with the work. A treadle rod 246 is attached to the same treadle that operates the treadle rod 206. Therefore, as the treadle rod 206 is depressed, the other arm 244 of the bell-crank lever 240 is drawn downwardly by the treadle rod 246, thereby bringing the arm 238 up against the hub 236. The rod 246 is passed through an opening 248 in the arm 244, a pair of nuts 250 retaining it. A spring 252 is disposed between the nuts and the arm 238 to prevent the operator from damaging the clutch by bringing the arm 238 up too hard against the hub 236.

Referring to Figs. 12 and 13, the line of stitches S is shown to be arcuate. Since the beater roll 172 is straight, it would apply the stiffening composition to the doubler along a straight line rather than on the curve of the line of stitches. It is not desirable to have the stiffening composition extend beyond the stitch line and therefore a shield 254 (Figs. 8 and 12) is mounted below the beater roll 172 so that it will come in contact with the doubler along the curved stitch line and prevent the application of stiffening composition beyond this line. The shield, as shown in Fig. 12, is provided with a curved edge 256 which is concave. The shield 254 is fastened by screws 258 to a bar 260 which extends across the width of the receptacle. The bar 260 is provided with vertical end members 262 the upper ends of which are fastened to blocks 264 (Fig. 9) by screws 266 passed through slots 268 in the members 262. As shown in Fig. 8, the corners of the members 262 are cut off at their upper ends to form a curved surface 265. A pair of plates 270 abut the upper ends of the members 262 and are spring-pressed downwardly against the top ends thereof by springs 272 mounted on bolts 274 which are screwed into the top of the blocks 264. The springs 272 are held under pressure by nuts 276 which may be adjusted on the bolts 274 to vary the pressure. It is obvious that by this construction the members 262 may be turned about the screws 266 to retract the shield 254 into an inoperative position. When the shield is retracted, the spring-pressed plates 270 will hold it in its retracted position until it is again forced into operative position. This permits the operator to draw the shield back for cleaning or replacement by a shield having a different contour. It is to be understood that in some shoes the curvature of the line of stitches or tip sweep may vary or may be in an opposite direction, and when this is the case, the edge of the shield 254 must be such as to correspond to the curvature of the work being handled.

The support 16, which holds the work during the application of the stiffening composition by the beater roll 172, is a rubber roll mounted for rotation in the direction of the arrow (Fig. 8)

upon a shaft 278 which is journaled in bearings 279 (Fig. 5), bearing caps 281 being provided for holding the shaft in the bearings. It is to be observed that the surface of the roll 16 moves in the same direction as the work. This aids in the withdrawal of the work and also reduces any tendency for the roll 16 to wipe the previously applied stiffening composition from the underside of the work. A sprocket 280 (Figs. 1 and 5) is fastened to the end of the shaft 278 and is driven by a chain 282 which passes around a sprocket 284 (Fig. 6) fastened to a shaft 286, the latter extending from the gear box 232. In order to hold the runs of the chain apart between their ends, a sprocket 288 (Fig. 1) is mounted on one of the walls 22 approximately midway between the ends of the chain.

As the work is drawn between the applying means, as will appear hereinafter, the under surface which has been coated with stiffening composition comes in contact with the surface of the roll 16 and a certain amount of the stiffening composition will stick to this surface. In order to remove the stiffening composition so that it will not harden on the surface of the roll and cause streaks on the finished work, means is provided for constantly cleaning the roll. This means, indicated generally by the reference character 290 (Fig. 8), consists of a receptacle for water which is supported beneath the roll 16 upon a pair of legs 292 pivotally fastened at their lower ends to the walls 22 by headed screws 294. A bar 296 is fastened to the front wall 298 of the receptacle by screws 300. The opposite ends of the bar are bent forwardly and outwardly, as shown in Fig. 10, and through the extremities of the outwardly-bent portions 302 screws 304 are passed which abut the upright edges of the walls 22. By adjusting the screws 304, the receptacle may be tilted about the screws 294 to change the position of the receptacle below the roll 16, for a purpose to appear hereinafter. A doctor blade 306 is fastened to the front wall of the receptacle by screws 308 and removes most of the excess stiffening composition from the surface of the roll, the screws passing through slots 310 formed in the wall, thereby permitting adjustment of the doctor blade to and from the surface of the roll. However, a slight amount of stiffening composition is still present on the surface of the roll and, consequently, means is provided for washing this surface. The means for washing the surface of the roll consists of a piece of felt 312 the lower end of which dips in water in the receptacle and the upper end of which is held against the surface of the roll 16. The felt is fastened to a leaf spring 314 by a bolt-and-clamp, indicated generally by the reference character 316, the leaf spring, in turn, being fastened to the inside of the receptacle and yieldably holding the felt against the surface of the roll. In order to remove the water from the surface of the roll 16, a squeegee roll 320 is mounted at the rear of the roll 16 in contact with its surface, the ends of the roll 320 being rotatably supported by a pair of screws 324 which are passed through plates 322 at opposite ends of the roll, the plates being fastened to the walls of the receptacle by screws 326. The adjustment of the squeegee roll to and from the surface of the roll 16 is effected by the adjusting screws 304 referred to above.

Figure 3:
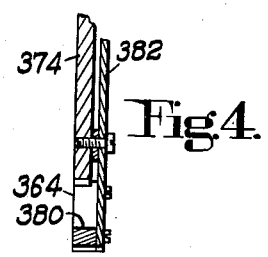
Fig. 3 is a detail of the cam driving mechanism.

When the applying means 10 and 14 have been brought together on opposite sides of the work, it is necessary, while the work is held between these applying means, to drag it laterally from between them so as to rub the stiffening composition into the texture of the fabric. While this may be done by the operator, by grasping the work projecting from the machine and pulling it, it is a rather arduous task because it requires a considerable pull to remove the work. Furthermore, in order to insure a uniform coating, which is highly desirable, it is necessary to drag the work from the machine at a uniform rate of speed. Therefore, in order to insure an even application of the stiffening composition, a pair of jaws 18 (Figs. 1 and 8) consisting of lower and upper members 330 and 332 are provided for gripping the work and withdrawing it from the machine at a uniform rate. The upper jaw 332 is formed by the lower edge of the horizontal member 260 which is fastened, as heretofore described, to the blocks 264. The blocks 264 are fastened to the ends of a pair of slide bars 336 which are slidably mounted in slots 338 formed in the members 74. The slide bars 336 are retained within the slots 338 by means of bands 340 (Figs. 6 and 7) which are secured to the members 74 by screws 342. A roll 344 (Figs. 1 and 9) is rotatably secured to each of the members 74 close to its end. The surface of each roll 344 contacts the surface of a slide bar 336 and acts as a bearing, facilitating the sliding movement of the bar. The lower jaw 330 is provided with a notched portion 334, which cooperates with a corresponding notch on the jaw 332, and is mounted for reciprocation to and from the applying means upon a pair of parallel slide bars 350 which are mounted above the top of the member 24. The slide bars 350 are slidably held on the member 24 by blocks 352, 354 and 356 (Fig. 5) which are attached thereto by screws, the blocks being provided with slots 356 which engage the sides of the bars 350. The rear ends of the bars 350, as shown in Fig. 6, are joined by a crossbar 358. In order to reciprocate the slide bars 350 to move the jaws from the position shown in Fig. 14 to the position shown in Fig. 15, a bar 360 is fastened to the crossbar 358 by bolts 362. The rear end of the bar 360, as shown in Fig. 3, is provided with a depending projection 364 having mounted thereon a cam wheel 366. The bar 360 extends beyond the depending portion and rests upon a hub 368 which projects from a disk 370 (Fig. 6) fastened to the driven shaft 60. The disk 370 engages one side of the bar 360 and holds it against the lateral surface of a cam 374, the latter being fastened to the shaft 60 at 376. The cam 374 is provided with a peripheral cam surface 378 and cam groove 380, the latter being formed by a plate 382 which is screwed to one side of the cam 374. The cam wheel 366, which is fastened to the depending portion 364 of the bar 360, projects laterally from the depending portion in the path of the cam surface 378 and cam groove 380. When the shaft 60 is rotated, as will appear hereinafter, the cam 374 turns with the shaft 60 in the direction indicated by the arrow in Fig. 2. As the cam 374 is moved against the cam wheel 366, the bar 360 is moved to the left, as shown in Fig. 3, thereby moving the bars 350 in the direction of the arrow shown in Fig. 15. The movement of the lower bars 350 upon which the lower part of the jaws is mounted is communicated to the upper jaw as follows. A pair of plates 384 (Fig. 1) are fastened by screws 386 to the bars 350, the upper ends of the plates having slots 388 therein which engage rollers 340 mounted on pins 351, the latter being mounted on plates 349 (Fig. 7) fastened to the bars 336. When, therefore, the bars 350 are moved forward, the plates 384 which engage the rollers 348 carry the bars 336 along so that both jaws move simultaneously to the left or to the right.

The shaft 60 has mounted thereon a pulley 390 (Fig. 6) which is connected by a belt 392 to a pulley 394, the latter being mounted on a shaft 396 which extends from the gear box 232. The pulley 390 normally runs freely on the shaft 60 but may be connected thereto to drive the same through a clutch disk 398 which is fastened to the shaft at 400. This is accomplished by a thrust member 402 mounted on the shaft 60 and operable by a chain 404 which, when pulled, will thrust the pulley 390 against the clutch disk 398 to complete the drive. The chain 404 is connected to the treadle rod 246 (Fig. 11) so that when the presser plate 12 and applying means 14 are brought into contact with the work the clutch 398 will be brought into operation to actuate the cam 374 and cause the jaws 330 and 332 to begin their outward movement to withdraw the work from the machine as the stiffening composition is being applied. The shaft 60 is supported at its ends in bearing sleeves 406 (Figs. 1 and 6) which are, in turn, supported at the upper ends of pedestals 408, the latter being bolted to the base 20.

In preparing the machine for operation, the operator adjusts the pressure in the stiffening composition container 188 and the time of the opening and the closing of the valves 42 and 189 for the applying means 10 and 14, respectively, to control and govern the amount of stiffening composition delivered to the work. The amount of penetration and the thickness of the coating are governed by the position of the presser plate 12 and the proximity of the beater roll 172 and doctor 185 to the surfaces of the work, which are adjustable as heretofore described. This is accomplished by lowering the carrier 72 against the stops 132 and then adjusting the stops until the space between the beater roll and support roll 16 is a few thousandths of an inch less than the thickness of the work. When this adjustment has been made, the presser plate 12 is adjusted so that the distance between it and the top of the cover member 36 is a few thousandths of an inch more than the thickness of the work. These adjustments will vary with the type and quality of the work, and it is to be understood that it is within the scope of this invention to make such changes in the adjustments as will give the best results for the particular kind of work being handled. To apply the stiffening composition, the operator takes an assembled upper, which in this instance we will assume comprises a tip, a doubler and a lining, turns the tip and lining back from the doubler and places the doubler with one side against the top of the cover member 36 with the tip projecting downwardly between the roll 16 and the sloping wall 34 of the receptacle 11. Prior to this time, that is, during the removal of the previous piece of work, a fresh quantity of stiffening composition was forced up through the slots 38 in the member 36 and, consequently, the bottom side of the doubler is in immediate contact with the stiffening composition. Thereupon the operator steps on the treadle to bring the presser plate 12 and applying device 14 down onto the top side of the doubler to press it against the surface of the applying device 10 and the support roll 16. As the presser plate 12 and applying device 14 are lowered, the valve 189 is opened to admit the stiffening composition to the receptacle 160, and the beater roll 172 is caused to rotate so that the stiffening composition is applied to the top side of the doubler as soon as the applying device 14 comes into contact therewith. Simultaneously, the jaws 18 are brought together on the opposite sides of the work and are actuated to drag the work laterally from between the aforesaid applying means. The operator holds the applying means 14 and the presser plate 12 down until the jaws have withdrawn the doubler from the applying means, and then releases the treadle, whereupon the carrier 72, upon which the applying means 14 is mounted, rises to its inoperative position under the action of the spring 82. As the carrier rises, the beater roll ceases to rotate, the valve 189 is closed and the vavle 42 is momentarily opened to extrude a new quantity of stiffening composition to the surface of the cover member 36, in readiness for the next piece of work.

Having described my invention, what I claim as new and desire to secure by Letters Patent of the United States is:

1. A machine for treating an upper consisting of a tip portion and a lining member secured thereto at a point separated from the toe end, comprising means for applying a stiffening composition to one face of the lining member, said applying means being arranged to lie between the lining member and the tip during the application of the stiffening composition to the lining member and having an applying surface adapted to contact the lining member, and means for progressively bringing the lining member and tip portion into engagement.

2. A machine for treating the forepart of an assembled upper consisting of a tip portion and a lining member, comprising means for applying a stiffening composition to the lining member, said applying means being arranged to lie between the lining member and the tip during the application of the stiffening composition to the lining member and having an applying surface adapted to contact the lining member, means on said first-named means for wiping said stiffening composition into the interstices of the lining member, and means for bringing said lining member and tip portion into contact.

3. A machine for treating the forepart of an assembled upper consisting of a tip portion and a lining member, which comprises means for applying a stiffening composition to the lining member, said applying means being arranged to lie between the lining member and the tip during the application of the stiffening composition to the lining member and having an applying surface adapted to contact the lining member, means on said first-named means for scraping said stiffening composition into the interstices of the lining member, and means for bringing said lining member and tip portion into contact.

4. A machine for preparing for lasting the forepart of an upper made up of a tip portion and a lining member secured thereto at a point separated from the toe end, comprising means for applying a stiffening composition to the lining member, means on said first-named means for concomitantly wiping and scraping the stiffening composition into the interstices of the lining member, and means for progressively bringing the lining member and the tip portion into engagement with each other.

5. A machine for treating an assembled upper made up of a tip portion and a lining member, which comprises applying means containing a stiffening composition for application to the lining member, said applying means being arranged to lie between the lining member and the tip during the application of the stiffening composition to the lining member and having an applying surface adapted to contact the lining member, means for pressing the lining member against the first-named means to force the stiffening composition into the interstices thereof, and means for bringing said tip portion and lining member into contact.

6. A machine for treating the forepart of an assembled upper comprising a tip portion and a lining member, which comprises means for applying a stiffening composition to the lining member, wiping means on said first-named means and pressure-applying means co-operable with the wiping means to wipe the stiffening composition into the lining member, and means for bringing said tip portion and lining member together.

7. A machine for treating the forepart of an assembled upper comprising a tip portion and a lining member, which comprises means for applying a stiffening composition to the lining member, scraping means on said first-named means and pressure-applying means co-operable with the scraping means to scrape the stiffening composition into the lining member to cause penetration thereof, and means for bringing the tip portion and lining member together.

8. A machine for treating an assembled upper made up of a tip portion and a lining member, comprising means for applying a stiffening composition to the lining member, wiping and scraping means on said first-named means, pressure-applying means co-operable therewith to drive the stiffening composition into the interstices of the lining member, and means for bringing said tip portion and lining member into contact.

9. A machine for treating an upper made up of a tip portion and a lining member, comprising applying means containing a stiffening composition for application to one side of the lining member, a support co-operable with said first-named means to hold the lining in engagement therewith during the application of the stiffening composition thereto, and means for bringing the tip portion and lining member together, said last-named means being adapted simultaneously to subject the superposed tip portion and lining member to pressure.

10. A machine for treating an upper made up of a tip portion and a lining member, which consists of means for applying a stiffening composition to one side of the lining member, and means for bringing the tip portion and lining member together, said last-named means being adapted simultaneously to subject the superposed tip portion and lining member to a beating action.

11. A machine for coating an article made up of more than one sheet, one of which has been partially separated from the other, comprising means for applying a stiffening composition to one side of said one sheet, and means for bringing the coated side of the one sheet and the adjacent side of the other sheet together, said last-named means simultaneously applying stiffening composition to the opposite side of the one sheet.

12. A machine for preparing for lasting the forepart of an upper made up of a tip portion, a lining, and an interposed doubler, the tip and lining having been separated from opposite sides of the doubler, comprising means for applying a stiffening composition to one side of the doubler, and means for bringing the coated face of the doubler and the tip portion into engagement, said last-named means simultaneously applying stiffening composition to the opposite side of the doubler.

13. A machine for treating the forepart of an assembled upper comprising a tip portion, a lining and an interposed doubler, comprising means for applying a stiffening composition to the opposite faces of the doubler, the means for applying stiffening composition to one side of the doubler being adapted progressively to bring one of the shoe parts into engagement with an adjacent coated surface of the doubler and to subject the superposed parts to pressure.

14. A machine for treating the forepart of an assembled upper comprising a tip portion, a lining, and an interposed doubler, which comprises means for applying a stiffening composition to the opposite sides of the doubler, one of said means driving the stiffening composition applied to one side through the doubler to cause complete penetration thereof, said means simultaneously and progressively bringing one of the shoe parts into engagement with the doubler and subjecting the superposed parts to beating action.

15. A machine for treating the forepart of an assembled upper comprising a tip portion, a lining, and an interposed doubler, which comprises means for applying stiffening composition to one side of the doubler, means for holding the doubler against said applying means, means for applying stiffening composition to the opposite side of the doubler, and means for holding the doubler against the second-named applying means, said second-named applying means and holding means being adapted to bring the shoe parts together.

16. A machine for treating the forepart of an assembled upper comprising a tip portion, a lining, and an interposed doubler, which comprises means for applying stiffening composition to one side of the doubler, means for concomitantly pressing, wiping and scraping the stiffening composition into said doubler, and means for applying stiffening composition to the opposite side of the doubler, said means being adapted simultaneously to bring one of the shoe parts and doubler together and to subject the superposed parts to a beating action.

17. A machine for impregnating a material with a stiffening composition comprising means for applying a stiffening composition to the material, pressure-applying means for holding the material against said applying means, one of said means being movable relatively to the other, means to effect such movement to cause said means to engage the opposite surfaces of the material, and means operable to move the material relative to the applying means, while said applying means and pressure-applying means are in operative position, to withdraw said material from between them.

18. A machine for impregnating a fabric with a stiffening composition comprising means for applying a stiffening composition to the fabric, fabric-pressing means adapted to hold the fabric against said applying means, means operable to withdraw said fabric from between said applying means and said fabric-pressing means, and means for moving said fabric-pressing means into a position to press the fabric against the applying means, said means simultaneously setting said withdrawing means in operation.

19. A machine for impregnating a fabric with a stiffening composition comprising means for applying a stiffening composition, a source of stiffening composition under pressure, fabric-pressing means adapted to hold the fabric against the applying means, means for withdrawing said fabric from between said applying means and the fabric-pressing means while under pressure, and means for setting said withdrawing means into operation, said last-named means operating to permit the passage of a predetermined quantity of stiffening composition from the source of supply to the applying means.

20. A machine for impregnating a fabric with a stiffening composition comprising a support for the fabric having openings therein through which the stiffening composition may be extruded, a member covering said openings, a source of stiffening composition under pressure, fabric-pressing means adapted to hold the fabric against the support, and means operable to bring said fabric-pressing means into engagement with the fabric on the support, said last-named means operating to cause said covering member to uncover the openings in said support for a predetermined period.

21. A machine for impregnating a fabric with a stiffening composition comprising a support for the fabric having openings therein through which the stiffening composition may be extruded, a member covering said openings, a source of stiffening composition within said support under pressure, fabric-pressing means adapted to hold the fabric against said support, means for withdrawing said fabric from between said support and said fabric-pressing means while under pressure, and means for setting said withdrawing means in operation, said last-named means operating to withdraw said covering member from said openings momentarily to cause a predetermined quantity of stiffening composition to be extruded.

22. A machine for impregnating a fabric with a stiffening composition comprising means for applying stiffening composition to one side of the fabric, jaws for gripping the fabric, a presser plate, means for moving said presser plate toward the applying means to hold the fabric against said applying means, said means simultaneously closing said jaws, and means for moving said jaws to withdraw said fabric from between the presser plate and the applying means.

23. A machine for impregnating a fabric with a stiffening composition comprising means for applying stiffening composition to the fabric, a presser plate movable toward said applying means, jaws for gripping the fabric, one member of said jaws being mounted to move with said presser plate and the other member of said jaws being associated with the applying means, means for moving said presser plate toward the applying means, said means simultaneously closing said jaws, and means for moving said closed jaws relative to the presser plate and applying means to withdraw the fabric from between them.

24. A machine for impregnating a fabric with a stiffening composition comprising a support, applying means mounted on said support, a carrier movably mounted on said support, presser means mounted on said carrier, a pair of jaws, one jaw being mounted on the support, the other on the carrier, means for moving said carrier to move the presser means toward the applying means and to close the jaws on the work, and means for reciprocating the jaws while they engage the work.

25. A machine for impregnating a fabric with a stiffening composition comprising a frame, means mounted on the frame for applying a stiffening composition to the work, a carrier movably mounted on the frame, presser means mounted on said carrier for holding the work against the applying means, a pair of jaws, slide means mounted on the frame and carrier, one of the jaws being fixed to each of said slide means, means for moving the carrier to bring the presser means and jaws into engagement with the work, and means for reciprocating said slide means.

26. A machine for impregnating a fabric with a stiffening composition comprising a frame, means mounted on the frame for applying stiffening composition to the work, a carrier movably mounted on the frame, presser means mounted on the carrier for holding the work against the applying means, a pair of jaws, ways in said frame and carrier, slides in said ways, one of said jaws being fastened to the slide in the frame and the other to the slide in the carrier, means for moving the carrier to bring the presser means and jaws into engagement with the work, and means for reciprocating the slides in said ways.

27. A machine for impregnating a fabric with a stiffening composition comprising a support for the fabric having openings therein through which the stiffening composition may be extruded, ridges adjacent to said openings, means for pressing the fabric against said support, and means for withdrawing said fabric from between said support and said first-named means while under pressure whereby said ridges wipe the stiffening composition into the interstices of the fabric.

28. A machine for impregnating a fabric with a stiffening composition comprising a support for the fabric having openings therein through which the stiffening composition may be extruded, ridges adjacent to said openings, said ridges having surfaces which slope upwardly from one opening to the next, fabric-pressing means adapted to hold the fabric against said support, and means for withdrawing said fabric from between said support and fabric-pressing means whereby said ridges wipe the stiffening composition into the interstices of the fabric.

29. A machine for impregnating a fabric with a stiffening composition comprising a support for the fabric, a rotatable roll for furnishing a quantity of stiffening composition, said rotatable roll being mounted for movement toward the support, means to effect such movement to cause the roll to engage the fabric on the support, and means for moving the fabric relative to the surface of the roll while held thereagainst thereby to wipe the stiffening composition into the interstices of the fabric and to cause penetration thereof.

30. A machine for impregnating a fabric with a stiffening composition comprising a support for the work, a rotatable roll, means for supplying said roll with stiffening composition, means for rotating said roll, means for pressing said roll against the fabric on said support, and means for dragging said fabric between said support and said roll in a direction opposite to the direction of rotation of said roll.

31. A machine for impregnating a fabric with a stiffening composition comprising a support for the work, a beater roll movable to and from the support, means for supplying stiffening composition to the surface of the beater roll, means for moving said beater roll into contact with the work on said support, means for rotating the roll to beat the stiffening composition into the fabric, and means for dragging the fabric between said beater roll and said support in a direction opposite to the direction of rotation of the beater roll.

32. A machine for impregnating a fabric with a stiffening composition comprising a support for the work, a roll movable toward said support, said roll having grooves therein, means for supplying stiffening composition to said grooves, means for rotating said roll, means for moving said rotating roll into contact with the fabric on said support, and means for dragging said fabric between the roll and support in a direction opposite to the direction of rotation of the roll.

33. A machine for impregnating fabric with a stiffening composition comprising a support for the work, a roll movable toward the support, said roll having spaced ridges thereon, said ridges having faces increasing in radius of curvature from their base to their apex, means for applying stiffening composition to said roll, means for rotating said roll in such a direction that the portion of the faces of least radius of curvature precedes the portion of greatest radius of curvature, means for moving said rotating roll into contact with the fabric on said support, and means for dragging said fabric between the roll and support in a direction opposite to the direction of rotation of the roll.

34. A machine for impregnating a fabric with a stiffening composition comprising a support for the work, a rotatable roll, means for supplying said roll with stiffening composition, means for rotating said roll, jaws for gripping said fabric, and means for moving said jaws to drag the fabric between said roll and said support.

35. A machine for impregnating a fabric with a stiffening composition comprising a support for the work, a rotatable roll, means for rotating said roll, means for supplying said roll with stiffening composition, gripping means, and means for moving said gripping means to withdraw the fabric from between the roll and the support in a direction opposite to the direction of rotation of the roll.

36. A machine for impregnating a fabric with a stiffening composition comprising a support for the work, a rotatable roll movable to and from the support, means for supplying said roll with stiffening composition, means for rotating said roll, means for moving said roll into engagement with the fabric on said support, and means for cutting off said means for supplying the roll with stiffening composition when said roll is not in contact with the fabric.

37. A machine for impregnating a fabric with a stiffening composition comprising a support for the work, a rotatable roll movable to and from the support, means for supplying said roll with stiffening composition, means for rotating said roll, and means for moving said roll into engagement with the fabric on said support, said means being operable to connect said roll to said means for rotating the roll just prior to contact with the work and to disconnect said roll from said means for rotating the roll when said roll is retracted from the work.

38. A machine for impregnating a fabric with a stiffening composition comprising a support for the work, a receptacle for said stiffening composition movable to and from the support, a roll associated with said receptacle and receiving a quantity of stiffening composition therefrom, means for applying pressure to the stiffening composition in said receptacle, means for moving said receptacle toward the support, said last-named means simultaneously connecting said pressure applying means to said receptacle, and means for dragging said fabric between the support and said roll.

39. A machine for impregnating a fabric with a stiffening composition comprising a support roll and a beater roll co-operable therewith, means for supplying said beater roll with stiffening composition, means for rotating said beater roll, and means for dragging said fabric between said rolls in a direction opposite to the direction of rotation of said beater roll.

40. A machine for impregnating a fabric with a stiffening composition comprising a support and a rotatable beater roll movable to and from the support, means for supplying said beater roll with stiffening composition, reciprocable fabric-gripping means for dragging said fabric between said beater roll and said support in a direction opposite to the direction of rotation of the beater roll, and means operable to cause said beater roll to rotate just prior to its contact with the work and to initiate reciprocation of said fabric-gripping means upon contact of the beater roll with the work.

41. A machine for impregnating a fabric with a stiffening composition comprising a support and a beater roll co-operating therewith, means for supplying said beater roll with stiffening composition, means for rotating said beater roll at high speed, and means for dragging said fabric between said beater roll and said support in a direction opposite to the direction of rotation of the beater roll at a relatively low speed.

42. A machine for impregnating a fabric with a stiffening composition comprising a support and a beater roll co-operating therewith for applying stiffening composition to the work, means for rotating said beater roll at high speed, and means for cooling said beater roll.

43. A machine for impregnating a fabric with a stiffening composition comprising a support and a beater roll co-operating therewith for applying stiffening composition to the work, a passage extending axially through the beater roll, and means for passing a cooling medium through said passage.

44. A machine for impregnating a fabric with a stiffening composition comprising a support and a beater roll co-operating therewith for applying a stiffening composition to the work, a passage extending axially through the beater roll, and a screw pump in said passage for passing a fluid cooling medium therethrough.

45. A machine for impregnating a fabric with a stiffening composition comprising a frame, a work support mounted thereon, a carrier movably mounted on the frame, a receptacle mounted on the carrier, a roll journaled in said receptacle with its lower side projecting through the bottom thereof, means for dragging the work between the roll and the work support, and means on said receptacle for governing the thickness of the coating.

46. A machine for impregnating a fabric with a stiffening composition comprising a frame, a work support mounted thereon, a carrier movably mounted on the frame, a receptacle mounted on the carrier, a roll journaled in said receptacle with its lower side projecting through the bottom of the receptacle, means for moving said carrier to bring said roll into engagement with the work on the support, means for dragging the work between the roll and the work support, a doctor along the lower edge of one wall of the receptacle, and means for moving the receptacle relative to the carrier to adjust the doctor to and from the work.

47. A machine for impregnating a fabric with a stiffening composition comprising a frame, a work support mounted thereon, a carrier movably mounted on the frame, trunnions on said carrier, a receptacle having an open bottom tiltably mounted on said trunnions, said trunnions having bores therein, a roll journaled in the bores of said trunnions within the receptacle with its lower side extending through the open bottom of the receptacle, a doctor along one edge of the open bottom, means for moving the carrier to bring the roll into engagement with the work on the support, means operable to withdraw the work from between the roll and the work support, and means for tilting the receptacle about the trunnions to move the doctor to and from the surface of the work.

48. A machine for impregnating a fabric with a stiffening composition comprising a frame, a work support mounted thereon, a carrier movably mounted on the frame, a receptacle mounted on the carrier, a roll journaled in said receptacle with its lower side projecting through the bottom of the receptacle, means for supplying stiffening composition to the receptacle, control means between said receptacle and said supplying means for regulating the flow of stiffening composition, and means for moving the carrier to bring the roll into contact with the work, said means actuating the control means.

49. A machine for impregnating a fabric with a stiffening composition comprising a frame, a work support mounted thereon, a carrier movably mounted on the frame, a receptacle mounted on the carrier, a roll journaled in said receptacle with its lower side projecting through the bottom of the receptacle, means for supplying stiffening composition to the receptacle, a valve between said receptacle and said supply means for controlling the flow of stiffening composition, and means for moving the carrier to bring the roll into contact with the work, said means actuating the valve to admit stiffening composition to the receptacle.

50. A machine for impregnating a fabric with a stiffening composition comprising a frame, a work support mounted thereon, a carrier movably mounted on the frame, a receptacle mounted on the carrier, a roll journaled in said receptacle with its lower side projecting through the bottom of the receptacle, means for supplying stiffening composition to the receptacle, a valve between said receptacle and said supply means for controlling the flow of stiffening composition, means for moving the carrier to bring the roll into contact with the work, means connecting the valve to said last-named means whereby said valve is actuated to admit stiffening composition to the receptacle, and means for adjusting the valve to vary the time and length of admission.

51. A machine for impregnating a fabric with a stiffening composition comprising a work support, means for applying stiffening composition to the work, a mask movable into engagement with the work, and means for bringing said applying means into engagement with the work on said work support, said means for bringing the applying means into engagement with the work being operative simultaneously to bring the mask into engagement with the work.

52. A machine for impregnating a fabric with a stiffening composition comprising a frame, a work support mounted thereon, a carrier movably mounted on the frame, an applying roll mounted on the carrier, a mask mounted on the carrier adjacent to the applying roll, and means for moving the carrier to bring the mask and applying roll into contact with the work on the work support.

53. A machine for impregnating a fabric with a stiffening composition, an edge of the area to be impregnated being curved, comprising a work support, means for applying stiffening composition to the fabric, said means being movable to and from the work support, a mask movable into engagement with the fabric, said mask having an edge corresponding in curvature to the curved edge of the area of the fabric to be impregnated, and means for moving said applying means into engagement with the fabric on said work support, said means being operable to move the mask into engagement with the fabric.

54. A machine for impregnating a fabric with a stiffening composition comprising a work support, means for applying stiffening composition to the work, said means being movable to and from the work support, a mask adjacent to the applying means and partially underlying the same, and means for moving the applying means and the mask into contact with the work on the work support, said mask being pivotally mounted so that it may be withdrawn from beneath the applying means.

55. A machine for impregnating a fabric with a stiffening composition comprising a work support, means for applying stiffening composition to the fabric, said means being movable to and from the work support, a mask adjacent to the applying means and partially underlying the same, means for moving the applying means and the mask into contact with the work on the work support, said mask being pivotally mounted so that it may be withdrawn from beneath the applying means, and spring means for holding the mask in operative or inoperative position.

56. A machine for impregnating a fabric with a stiffening composition comprising a support roll for the work, means for applying stiffening composition to the work, and means for constantly cleaning the support roll comprising a scraper held against said support roll, means for washing the roll, and means for wringing the washing fluid from the roll.

57. A machine for impregnating a fabric with a stiffening composition comprising a supporting roll for the work, means for applying stiffening composition to the work, and means for constantly cleaning the supporting roll comprising a scraper held against the roll to remove the excess stiffening composition, a wick bearing against the roll, said wick being supplied with water for washing the surface of the supporting roll, and a squeegee roll for removing the water from the surface of the roll.

58. A machine for impregnating a fabric with a stiffening composition comprising a support roll for the work, means for applying stiffening composition to the work, and means for constantly cleaning the support roll comprising a container disposed below the support roll, a scraper fastened to the container, a wick in the container for supplying water to the surface of the roll, a squeegee roll mounted parallel to the support roll to remove the water therefrom, and means to shift the container with respect to the support roll to bring the squeegee roll into engagement with the surface of the support roll.

59. A machine for impregnating a fabric with a stiffening composition comprising means for applying stiffening composition to one side of the work, means for holding the work in engagement with the applying means, means for applying stiffening composition to the opposite side of the work, means for holding the work in engagement with the second-named applying means, and means for dragging the work from between said applying means and work holding means, said second-named applying means being spaced laterally from the first-named applying means in the direction of movement of the work.

60. A machine for impregnating a fabric with a stiffening composition comprising an extrusion means for applying stiffening composition to one side of the work, means for pressing the work into engagement with the extrusion means, means for applying stiffening composition to the opposite side of the work, means for holding the work against the second-named applying means, and means for dragging the work from between said applying means, said second-named applying means being spaced laterally of the extrusion means in the direction of movement of the work.

61. A machine for impregnating a fabric with a stiffening composition comprising means for applying stiffening composition to one side of the work, means for pressing the work into engagement with the applying means, an applying roll for applying stiffening composition to the opposite side of the work, means for holding the work against the applying roll, and means for dragging the work from said applying means, said applying roll being spaced laterally from the first-named applying means in the direction of motion of the work.

62. A machine for impregnating a fabric with a stiffening composition comprising extrusion means for applying stiffening composition to one side of the work, means for pressing the work into engagement with the extrusion means, an applying roll for applying stiffening composition to the opposite side of the work, means for holding the work against the applying roll, and means for dragging the work from between said applying means, said applying roll being spaced laterally of the extruding means.

63. A machine for impregnating a fabric with a stiffening composition comprising extrusion means for applying stiffening composition to one side of the work, a presser plate for holding the work against the extrusion means, an applying roll for applying stiffening composition to the opposite side of the work, a support roll for holding the work against the applying roll, and means for dragging the work from between said extrusion means and said applying roll, said applying roll being spaced laterally from said extrusion means in the direction of movement of the work.

HANS C. PAULSEN.